Feb. 2, 1937. J. C. OLSEN 2,069,385
BELT FASTENER
Filed April 12, 1935 2 Sheets-Sheet 1
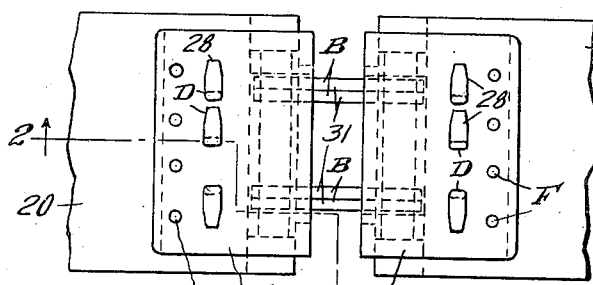
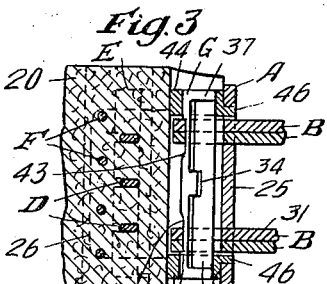
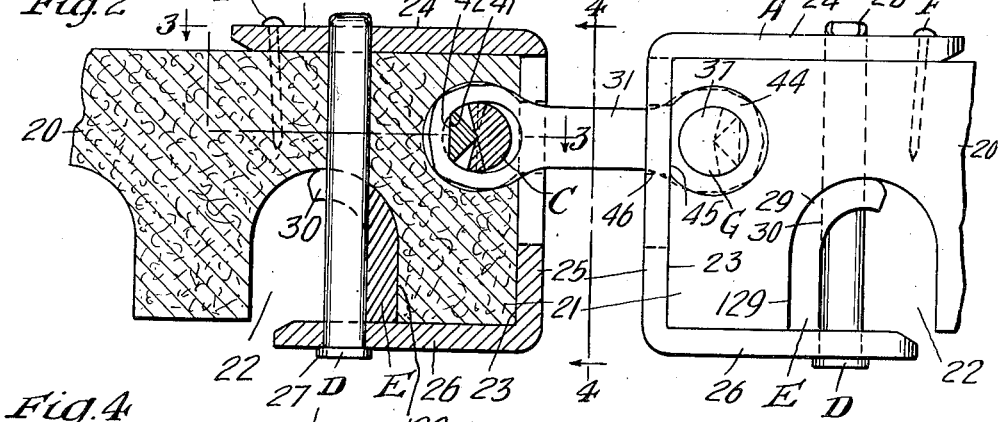
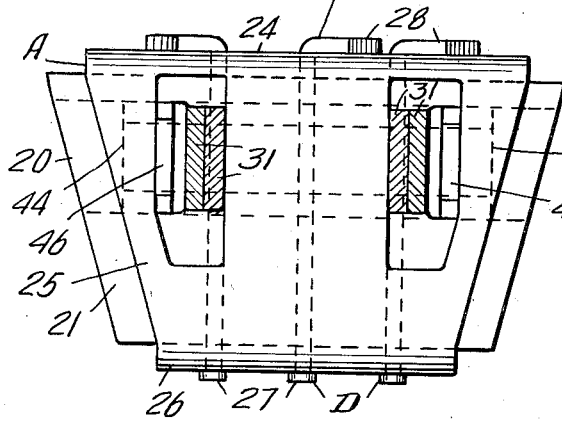
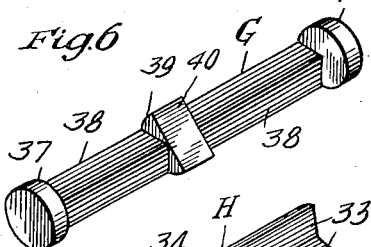
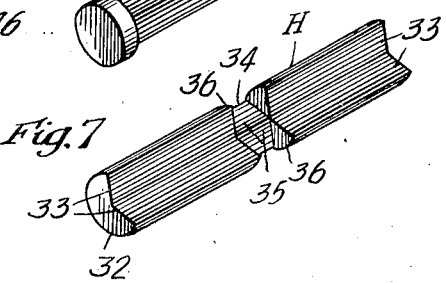
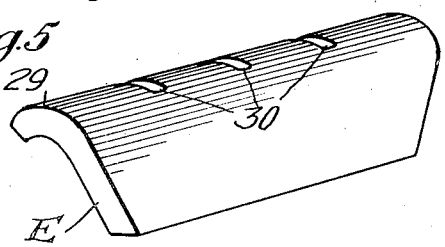
Inventor
John C. Olsen
By Joseph Harris
his Atty.

Feb. 2, 1937. J. C. OLSEN 2,069,385
BELT FASTENER
Filed April 12, 1935  2 Sheets-Sheet 2
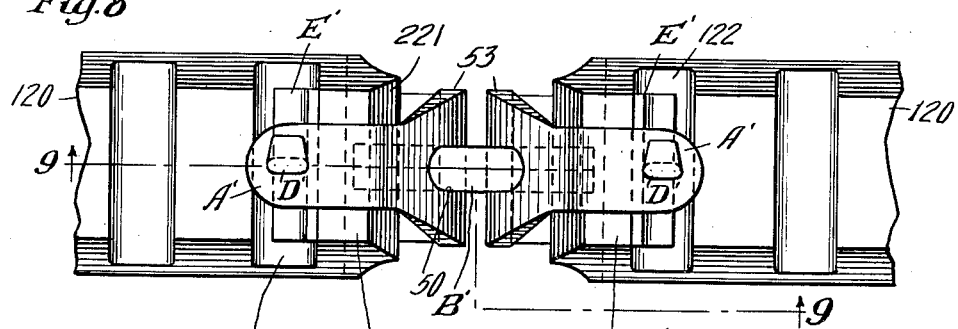
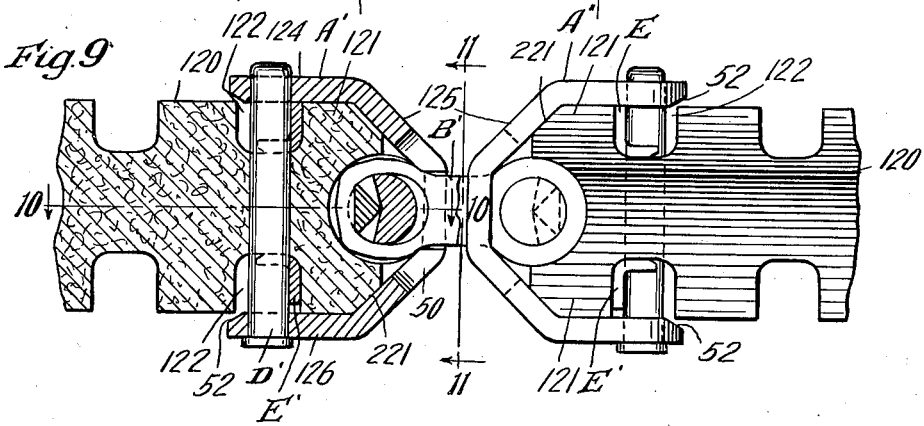
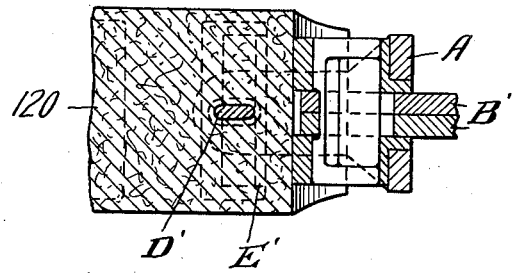
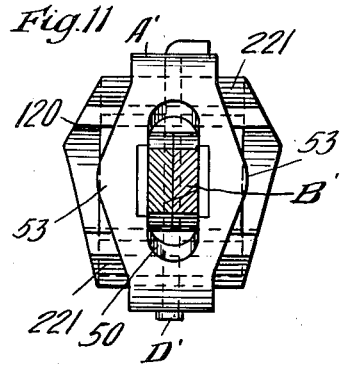
Inventor
John C. Olsen
By Joseph Harris
his Atty.

Patented Feb. 2, 1937

2,069,385

UNITED STATES PATENT OFFICE 2,069,385

BELT FASTENER

John C. Olsen, Chicago, Ill., assignor to Flexible Steel Lacing Company, Chicago, Ill., a corporation of Illinois Application April 12, 1935, Serial No. 15,951

14 Claims. (Cl. 24—33).

This invention relates to improvements in belt fastener and, more specifically but not exclusively, fasteners for side drive or V-belts.

One type of V-belt now in common use, is provided with transversely extending notches or recesses throughout its length, said notches or recesses generally being located on the inner side only but in some instances on the outer side also. The purpose of notching said V-belts, as well-known, is to insure greater flexibility to facilitate curving of the belts while conforming to the pulleys when passing thereover. In the use of said notched V-belts, which are usually made of fabric and rubber, it is well recognized that the tension stresses are transmitted substantially entirely through the solid or unnotched portions of the belt, the lugs or projections formed by the notches serving primarily only to maintain the belts in their proper positions in the grooves of the pulleys. Heretofore, great difficulty has been experienced in providing satisfactory means for attaching any fasteners to the ends of such notched belts. Prior to the present invention, so far as known, all proposed means of attaching the fasteners have included bolts, rivets or the like extended through the extreme end lug portions of the notched belt, that is, the attaching means have been located outwardly beyond the first notch. Experience has demonstrated that fasteners so attached, relatively quickly effect destruction of the belt in that portion of reduced cross-section over the first notch inwardly from the end of the belt. The constant flexing of the belt in said area of reduced cross-section, rapidly disrupts the material radially aligned with the notch and generally along that corner where the end lug defined by the end notch, merges with the main portion of the belt. Apparently this is due to the fact that the end lug of the belt on the inner side thereof is pulled outwardly more or less in the form of a lever with a moment arm having its center at the junction of the lug and main portion of the belt in the first notch or recess.

One object of the present invention, therefore, is to provide a simple, relatively inexpensive but extremely rugged means of attaching fasteners to notched types of belts and such that the disrupting effects are eliminated to thereby prolong the effective life of the fasteners and belts.

More specifically, an object of the invention is to provide an attaching means of the character indicated in the preceding paragraph, wherein the usual end lug or lugs are utilized under shear to retain the securing pins or equivalent and so as to eliminate any leverage moments that would otherwise tear or disrupt the belt material at the junction of the lugs with the main portion of the belt.

In prior flexible or hinge types of fasteners for notched V-belts, it has always been deemed necessary to locate the flexible or hinged joints outwardly beyond the ends of the belt due to the fact that the extreme lug end of the belt was all required for the reception of the attaching bolts or rivets. With such constructions, additional stresses are necessarily imposed on the belt by reason of the constant whipping action of the belt in passing onto and off the pulleys, since there is necessarily a relatively long non-flexible arm extending from the inner wall of the lug outwardly to the axis of the flexible or hinged joint. This in turn further accelerated the destruction of the belt.

Another object of this invention, therefore, is to provide a belt fastener of the flexible type particularly adapted for notched V-belts, wherein the flexible or hinge connections of the fasteners proper, are located within or partially within the belt material so as to reduce to a minimum the length of the rigid or non-flexible portion of the belt at the end thereof and to thereby minimize any effects resulting from the whipping action of the belt.

Other objects of the invention will more clearly appear from the description and claims hereinafter following.

In the drawings forming a part of this specification, Figure 1 is a top plan view of the adjacent end portions of a relatively wide V-belt, showing the improved fastener employed therewith. Figure 2 is an enlarged part vertical sectional view, part side elevational view, corresponding to the line 2—2 of Figure 1. Figure 3 is a horizontal sectional view on the same scale as Figure 1, corresponding to the section line 3—3 of Figure 2. Figure 4 is a vertical transverse sectional view corresponding to the line 4—4 of Figure 2. Figure 5 is a detailed perspective of one of the backing plates employed. Figures 6 and 7 are detailed perspective views of the two elements constituting the improved rocker pin. Figure 8 is a view similar to Figure 1 illustrating another embodiment of the invention. Figure 9 is a view similar to Figure 2 corresponding to the line 9—9 of Figure 8. Figure 10 is a horizontal sectional view corresponding to the line 10—10 of Figure 9. And Figure 11 is a vertical transverse sectional view corresponding to the line 11—11 of Figure 9.

Referring first to the construction illustrated in Figures 1 to 7 inclusive, 20—20 indicate the end portions of a relatively wide and heavy-duty V-belt having a series of alternating lugs and recesses on its inner side, the recesses extending transversely, as customary, so as to provide greater flexibility in the belt and allow the belt to more readily accommodate itself in passing over the pulleys. In practice, the end of the belt will be cut so as to leave an end lug 21 at the extreme end of the belt and a corresponding recess 22 adjacent thereto. In the construction now being described, the ends of the belt will also preferably be cut off square, as indicated at 23. Said belts, as customary, will be composed of fabric, cords, rubber and the like and are of a resilient character.

The means for connecting the belt ends, as shown, preferably comprises a pair of bail-like attaching members A—A; a plurality of laterally spaced links B—B; a rocker pin connection C between each attaching member A and the links; a plurality of securing pins D—D; and load-distributing or bearing plates E—E. Supplemental securing means in the form of short nails or brads F—F may also be employed.

Each attaching member A comprises an outer arm 24, a flat bight section 25 seated directly against the flat end 23 of the belt and an inner arm 26. The arms 24 and 26 are so spaced as to snugly engage or embrace the inner and outer faces of the belt and are of such length as to extend inwardly an appreciable distance beyond the endmost lug 21 only, that is, so that the inner ends of the arms 24 and 26 will overlie partially or approximately entirely the endmost recess 22, as clearly shown in Figure 2 but not so as to embrace the second lug from the end. The outer arm 24 is relatively wider than the inner arm 26, as best shown in Figure 4, and the width of all portions of the attaching members A will be slightly less than the width of the corresponding adjacent portions of the belt so as to eliminate any possibility of the metal members A engaging and scoring the walls of the pulley grooves.

Each member A is attached to its belt end preferably by a plurality of pins D suitably laterally spaced and extended through aligned apertures in the arms 24 and 26, said pins D being located inwardly of the endmost lug 21, as shown, and so as to extend through the main or body portion of the belt and also through the endmost recess 22 in spaced relation to the adjacent wall of the end lug 21. The pins D are preferably of a cross-section elongated in the direction of length of the belt and relatively narrow in a direction transversely of the belt so that, when passed through a previously formed slit in the material of the belt, the latter will not swell laterally. By slitting, as distinguished from boring a hole, and using a pin of the character described, no material of the belt or any of its strength is lost. The front and rear edges of each pin D are also preferably rounded, as shown, so as to minimize any tendency to sever the belt material under tension loads. Each pin is provided with a head at one end, as indicated at 27, and at its other end is tapered so as to provide a bendable tang 28 that may be easily hammered down as shown.

To distribute the pulling load adequately to the belt and in such manner as to eliminate a tortional or leverage action on the end lug 21 and, in lieu thereof, place the material constituting the end lug 21 under a shearing stress where it merges with the main body of the belt, a detachable bearing plate E is disposed in each recess 22 between the several pins D and inner wall 129 of the end lug 21. Each plate D preferably rests at its lower edge on the inner arm 26 and is of a width and contour corresponding to the bight section 25 of the attaching member. Each plate E is curved at its upper end, as indicated at 29, so as to conform to the contour of the recess, and said curved section 29 is notched at intervals, as indicated at 30, to accommodate the pins therethrough so that, when the attachment to the belt is completed, the plate E is thereby prevented from displacement, as will be apparent. As clearly shown in Figure 2, a relatively long bearing is provided between each pin D and the plate E so that the pulling or tension stresses transmitted from the arms of the member A to the pin D, will in turn be transmitted through the pins D horizontally or in the line of the belt to the plate E. The load thus transmitted to the plate E is in turn applied against the lug 21 also horizontally and in the line of the belt, thus putting the belt material where the lug unites with the main body of the belt, under shear, which affords the maximum resistance against tearing out or disruption of the belt. This action serves to eliminate any tendency of the end lug 21 being pulled or swung by a leverage action that would obviously tend to stretch or tear the material in the upper portion of the recess 22 and cause rapid destruction of the belt at that point.

Each link B preferably comprises a pair of relatively thin plates 31—31 such that the same may be readily made by stamping. The ends of the link plates are enlarged and of somewhat irregular external contour and suitably apertured for the reception of the rocker pin, all preferably as more fully described and claimed in my co-pending application 10,264, filed March 9, 1935 and to which reference may be had.

To provide for the rockable or adjustable connection between the links and the attaching members A, the improved rocker pin best illustrated in Figures 6 and 7 is employed. As there shown, the rocker pin comprises two elements G and H. The element H is formed with a cylindrical exterior surface 32 extending throughout its length and, on its inner side, is provided with a reentrant angle or V formation 33. The latter is in two longitudinally separate sections, as best illustrated in Figure 7, with an interposed central recessed portion 34. The latter is constituted by cutting away portions so as to leave relatively blunt wedge-shaped connecting section 35 with adjacent shoulders 36—36 for the purpose hereinafter described.

The other pin element G is formed at its ends with disklike flanges 37 adapted to overlie the ends of the element H, and an intermediate longitudinally extending connecting section 38 of sector cross-section. The sector section 38 is divided into two longitudinally separated portions by a central enlargement 39 having a flat diametrically extending face 40, the enlargement 39 being adapted to enter the recesses 34 of the member H and cooperate with the shoulders 36 of the latter. The included angle between the radial faces of the sector portions 38 of element G will preferably be made 90°, whereas the included angle between the reentrant faces of the complemental V groove sections 33 of the member H will be 135°, thus allowing for a rocking movement between these complemental sections, of 45°. The included angle between the radial faces of the central cut-away section 35 of element H will preferably be 135°, thereby allowing for a rocking movement between this section and the enlargement 39 of element G, of 45° also. The enlargement 39 of element G is provided primarily to increase the strength thereof at its center and thus minimize any tendency to bend either under load or while being heat-treated.

The element G, on its outer side is provided at longitudinally spaced intervals so as to align with the links B, with flattened faces 41 to cooperate with corresponding flat edges 42 of the links to thereby provide a non-rockable engagement between the links and the element G and hence insure that the rocking action takes place on the knifelike edges of the elements G and H. It will be noted, as best shown in Figure 3, that the flattened faces 41 form shoulders 43 on the link G which thereby prevent accidental endwise shift of the rocker pin with reference to the links and belt, when all the parts are assembled.

All curved surfaces of the elements G and H are struck on substantially the same radius so that the assembled pin G—H may have its ends seated in bearing bushings 44 that are interposed between the ends of the rocker pin and bight section 25 of the attaching member A. Each of said bushings 44 has a flat front face 45 engaging the inner face of the bight section and an outwardly extended lip or flange 46 extending into the corresponding aperture of the bight, thus preventing endwise displacement of the bushings while at the same time allowing for a slight up and down movement of the bushings relative to the attaching member A.

The bushings 44, rocker pin and ends of the links are all disposed within an approximately cylindrical recess cut transversely through the belt substantially in line with the neutral axis of the belt and snugly seated in the material thereof, as clearly shown in Figures 2 and 3, all as more fully described in said application 10,264. In this manner, a connection is effected which is substantially sealed against entrance of foreign matter into the rocker pin connection and, further, the rocker pin connection may yield slightly so as to reduce any tendency of the attaching members A to crystallize because of the constant whipping action when in motion. It will be noted, also, that the effective axes of the adjustable connections between the attaching members A are located well within the belt material, thus shortening to the minimum, the rigid section of the end portions of the belt, which in turn serves to prolong its life in service.

Referring next to the construction illustrated in Figures 8 to 11, the ends of the belt there shown are indicated at 120—120. The V-belt there illustrated is provided with a series of alternated lugs and recesses on both its outer and inner sides and, as best shown in Figure 9, the belt is of double wedge or V cross-section, with the neutral axis slightly below the widest section thereof. In the fastener for this type of belt, the endmost lugs 121—121, both top and bottom, are preferably chamfered, as indicated at 221, and the bail-like attaching members A'—A' have more or less V-shaped bight sections 125—125 conforming to and partially engaging the chamfered portions 221. The bight sections 125 are apertured, as indicated at 50, to receive a single or double plate link B' therethrough, the latter being adjustably connected to the members A' by a rocker pin connection substantially the same as that disclosed in said application 10,264 and which need not be described in detail herein.

To attach the members A' to the belt ends, the arms 124 and 126 of said members are extended inwardly beyond the end lugs so as to overlie both of the outer and inner endmost recesses 122—122 similar to the construction previously described. A similar pin D' is employed to secure each member A' to its belt end, the pin being passed through aligned perforations in the arms 124 and 126, through the main or body portion of the belt and through both of the recesses 122 in slightly spaced relation to the lugs 121. Similar bearing plates E' are employed, one in each recess 122, the same being interposed between the pin and adjacent faces of the lugs 121, as previously described, and each having a single notch to accommodate one pin D'. In this construction as also in the construction previously described, the inner ends of the arms 124 and 126 may be chamfered, as indicated at 52, so as to avoid any possibility of a sharp edge digging into the belt material as the belt is flexed.

In the construction of Figures 8 to 11, the same advantages in the attachment of the bail-like members to the belt ends are obtained as previously set forth for the construction illustrated in Figures 1 to 7, with the additional feature that both the outer and inner lugs are placed under shear by the load transmitting plates E', thus obtaining the maximum effective resistance against tearing or pulling out of the pin in service. In the construction of Figures 8 to 11, due to the fact that the belt is of double wedge or double V section, both the outer and inner arms of the attaching members A' will preferably be made of the same width and the bight section widened as indicated at 53 so as to obtain greater strength therein to resist the tension loads imposed through the links. Also, the bearing plates E', rather than conforming to the contour of the bight sections, will be made as wide as possible so as to distribute the load most effectively, but of such length as to insure that the plates will not come in contact with the side walls of the pulley grooves.

Although there has herein been shown and described what is now considered the preferred manner of carrying out the invention, the same is by way of illustration only and not by way of limitation. All changes and modifications are contemplated that come within the scope of the claims appended hereto.

What is claimed is:

1. In a device of the character described, the combination with a belt transversely recessed so as to leave a lug and a recess inwardly thereof, at each end of the belt; of a pair of attaching members each having a pair of straight arms embracing an end portion of the belt, both said arms extending inwardly beyond the corresponding belt end lug; securing means, for each said member, extended through said arms, the body portion of the belt and said recess inwardly of the belt lug; a detachable bearing plate conformed to the recess interposed between said securing means, the corresponding arm extension and the adjacent face of the lug; and means connecting said attaching members.

2. In a device of the character described, the combination with a V-belt provided with a series of alternating recesses and lugs on both its inner and outer faces and terminating with lugs at each end thereof; of inter-connected bail-like members each having its arms embracing the end lugs and extending partially over and terminating in line with the adjacent endmost recesses of the belt end; a securing element extended through the arms of each attaching member, main portion of the belt and endmost recess, said element constituting the sole securing means for each member; and means for transmitting portions of the load from each securing element to each of the end lugs of each belt end.

3. In a device of the character described, the combination with a V-belt transversely recessed to provide lugs at each end thereof; of a pair of bail-like attaching members each having its arms embracing a belt end and extended inwardly beyond the end lug thereof; a link connection extending between said attaching members; means for attaching each of said members to its respective belt end, said means including a securing element extended through the arms of the member and belt inwardly of the end lug; and a detachable bearing plate interposed between the securing element, the corresponding arm extension and the lug.

4. In a device of the character described, the combination with a V-belt provided with transversely extending recesses on both its inner and outer faces to thereby form lugs at each end thereof; of a pair of bail-like attaching members each having its arms embracing the end lugs of a belt end and extended inwardly beyond the lugs; link connecting means extending between and flexibly connecting said attaching members; and means for securing each member to its respective belt end, said means including a securing element extended through the arms of the member and the body of the belt inwardly of the respective end lugs, and a bearing plate in each of the end recesses interposed between the securing element and the adjacent end lug.

5. In a device of the character described, the combination with a V-belt provided with a series of alternated lugs and recesses on its inner side and terminating with a lug at each end of the belt; of a pair of bail-like attaching members each having its arms embracing the inner and outer faces of a belt end and both extended inwardly beyond the end lug thereof; means connecting the attaching members; means for securing each member to its respective belt end including a securing element extended through the arms of the member, body of the belt and endmost recess, and a detachable bearing plate disposed in said recess and interposed between the securing element, the corresponding arm extension and adjacent end lug.

6. As an article of manufacture, a rocker pin for belt fasteners and the like, said rocker pin comprising two elements each having longitudinally separated complemental rocker bearing faces of knife-edge and V-formation, and cooperable means on said elements to prevent relative longitudinal shift therebetween, said means being located intermediate said complemental bearing faces.

7. In a fastener for the ends of a V-belt having a series of alternating lugs and recesses on both its inner and outer faces, the combination with a pair of bail-like attaching members each having its bight portion apertured, each member having its arms extended so as to embrace the end lugs of the belt ends and to overlie the adjacent recesses; of link means extending through the apertures of said members; rocker pin connections between the respective ends of the link means and inner sides of the bight portions of said members; and means for securing each of said members to its respective belt end, said means including a pin extended through the arms of the member and located inwardly of the end lugs of the belt end.

8. In a fastener for the ends of a V-belt having a series of alternating lugs and recesses on its inner face, the combination with a pair of bail-like attaching members each having its bight portion provided with a plurality of laterally spaced apertures, each of said members having its arms so extended as to project inwardly beyond the end lug of the belt end; of a plurality of laterally spaced links extending through the apertures of said members; a rocker pin connection between each set of ends of the links and inner side of the corresponding bight of the attaching member; a plurality of securing pins for each member, located inwardly of the end belt lug and adapted to extend through the adjacent recess of the belt; and a detachable bearing plate adapted to be located in each said recess between the securing pins and end lug.

9. In a fastener for the ends of a V-belt having a series of alternating lugs and recesses on both its inner and outer faces, the combination with a pair of bail-like attaching members each having its bight portion apertured and the arms of such length as to extend inwardly of a belt end beyond the end lugs and over the adjacent recesses; of a link extended through the apertures of said members; a rocker pin connection between each link end and the inner side of the attaching member; and means for securing each member to a belt end, including a pin extending through the arms of the member and located inwardly of the end lugs, and a detachable bearing plate in each endmost recess, adapted to be interposed between the pin and adjacent end lug.

10. As an article of manufacture, a rocker pin for belt fasteners and the like, said rocker pin comprising two elements, one of said elements having longitudinally separated knife edge formations and an intermediate enlargement, the other element having longitudinally separated complemental reentrant V formations and an intermediate recess to accommodate said enlargement, said knife-edge formations being arranged to rock on said V-formations when the parts of the pin are assembled and in operation.

11. In a fastener adapted for joining the ends of a side driving belt having alternated lugs and recesses on its inner side, a pair of attaching members each having arms arranged to embrace the inner and outer faces of a belt end and with the inner arm extending from the belt end beyond the endmost lug thereof; a separately formed bearing plate cooperable with each arm extension and arranged to be disposed within the corresponding endmost belt recess; a securing element arranged to be extended through each said arm extension and the corresponding main portion of the belt which is in line with said endmost recess; and means for retaining said bearing plates against shift transversely of the belt when in place.

12. A fastener in accordance with claim 11 wherein said means comprise recessed extensions on said bearing plates in which the corresponding securing elements are disposed when the fastener is applied to the belt.

13. In a fastener adapted for joining the ends of a side driving belt having, on its inner side, lugs alternated with recesses having curved bottoms, a pair of attaching members each having arms arranged to embrace the inner and outer faces of a belt end and with the inner arm extended from the belt end beyond the endmost lug thereof; a separately formed bearing plate cooperable with each arm extension, each said bearing plate having a rounded end portion conforming to the rounded recess of the belt; a securing element arranged to be extended through each arm extension and the corresponding main portion of the belt in line with the endmost recess; and means for retaining said bearing plates against shift transversely of the belt when the fastener is in place.

14. In a device of the character described, the combination with a V-belt provided with a series of alternated lugs and recesses on its inner side and terminating with a lug at each end of the belt; of a pair of bail-like attaching members each having its arms embracing the inner and outer faces of a belt end and both extended inwardly beyond the corresponding end lug thereof; means connecting said attaching members; a separately formed bearing plate disposed in each of said endmost recesses; and a plurality of securing pins extending through each set of extended arms and the corresponding main body portion of the belt in line with the endmost recess, the bearing plates being interposed between said securing pins, the inner arm extension and corresponding end lug of the belt, each said bearing plate having a recessed portion to accommodate the securing pins and to prevent endwise shift of the bearing plates.

JOHN C. OLSEN.